Feb. 3, 1970     K. H. WARREN     3,493,279

BEARING LUBRICATION APPARATUS

Filed May 29, 1968     2 Sheets-Sheet 1

INVENTOR
KENNETH H. WARREN

BY Ronn McGiehan
AGENT

D. Hodges
ATTORNEY

United States Patent Office

3,493,279
Patented Feb. 3, 1970

3,493,279
BEARING LUBRICATION APPARATUS
Kenneth H. Warren, Glen Burnie, Md., assignor to the United States of America as represented by the Secretary of the Navy
Filed May 29, 1968, Ser. No. 733,069
Int. Cl. F16c 1/24, 33/78
U.S. Cl. 308—187                6 Claims

ABSTRACT OF THE DISCLOSURE

Apparatus for lubrication of anti-friction bearings, using the oil bleeding characteristics of grease, comprising a housing for attachment to a bearing, and having a grease reservoir wherein the grease is retained in a sloping honeycomb structure or similar foraminous material.

---

The invention described herein may be manufactured and used by or for the Government of the United States of America for governmental purposes without the payment of any royalties thereon or therefor.

BACKGROUND OF THE INVENTION

The present invention relates to apparatus for lubrication of anti-friction bearings, and more particularly to the utilization of the oil bleeding characteristic of grease in a reservoir for subsequent flow into the bearing. The instant invention does not utilize the normal bearing lubrication systems of movement of the grease into the bearing, or the use of an oil-wick system commonly used today. In the instant invention, grease is packed into a honeycomb structure or other foraminous material located in a reservoir in a housing which may be integral or attached to a bearing housing. Heat produced by the bearing wil cause the grease to bleed oil from the structure and into the bearing via a passageway at the bottom of the reservoir.

This novel system solves the disadvantages of the commonly used lubricating systems. The amount of grease which can be packed into ordinary bearing housing is limited, especially in large bearings, because it is desirable to avoid the slumping of grease into the bearing which causes temperature rise sufficient to effect bearing failure or short performance life. Even with smaller amounts of grease, vibration may cause movement of the grease into the bearing resulting in deterioration of the grease or at least the exhaustion of the lubricant in a short period of time.

Experience with grease lubrication systems has also shown that a hard crust often forms on the grease packing immediately adjacent to the bearing, while the grease remote from the bearing remains soft and usable. This crust formation restricts the oil bleeding from the grease, thus leaving usable grease unused and substantially cutting off the lubrication effect.

Present oil systems using drip feed are difficult to regulate to the small quantities required by the bearing, and consequently over-lubrication or under-lubrication results. Furthermore, orifices for regulating the flow of oil may become obstructed resulting in lubricant starvation of the bearing.

SUMMARY

The purpose of the instant invention is to provide a grease lubricating apparatus having none of the disadvantages of the prior art. A housing is provided adjacent the bearing in its support, the housing having a reservoir for containing grease. The grease is packed in a honeycomb section comprising the reservoir, the voids of which slope downwardly away from the bearing. Oil bleeding from the grease runs down the slope to settle in the lower portion of the cavity in the reservoir and subsequently flows through an aperture toward the bottom of the bearing. The orbiting balls of the bearing will pick up the oil and distribute it throughout. Any crust developing on the surface of the grease will occur on the bearing side of the honeycomb where no oil bleed is expected to occur. The remote side of the grease will be free of crust permitting oil bleed, as previously described. A wire screen may be placed over the remote side of the honeycomb and grease structure to prevent the grease from slumping into the oil passages and bearing. The grease will be therefore positively maintained in its initial position. Furthermore, any commonly used oil distribution system such as slingers, wicks, rings, and splash feeding may be used in conjunction with the proposed system. The advantages of oil as a heat transfer medium and its low viscosity and consequent low torque losses can be thus utilized.

Accordingly, it is the principal object of this invention to provide a bearing lubrication apparatus utilizing oil bled from grease to supply lubrication to the bearing.

Another object of this invention is to provide a bearing lubrication apparatus wherein the flow of lubricant to the bearing is self controlling.

Still another object of this invention is to provide a bearing lubrication apparatus wherein substantially all the grease lubricant may be utilized without fear of lubricant starvation.

Other objects and features of the invention will become apparent to those skilled in the art upon reference to the accompanying specification, claims and drawings in which:

DESCRIPTION OF THE PREFERRED EMBODIMENT

Figure 1:
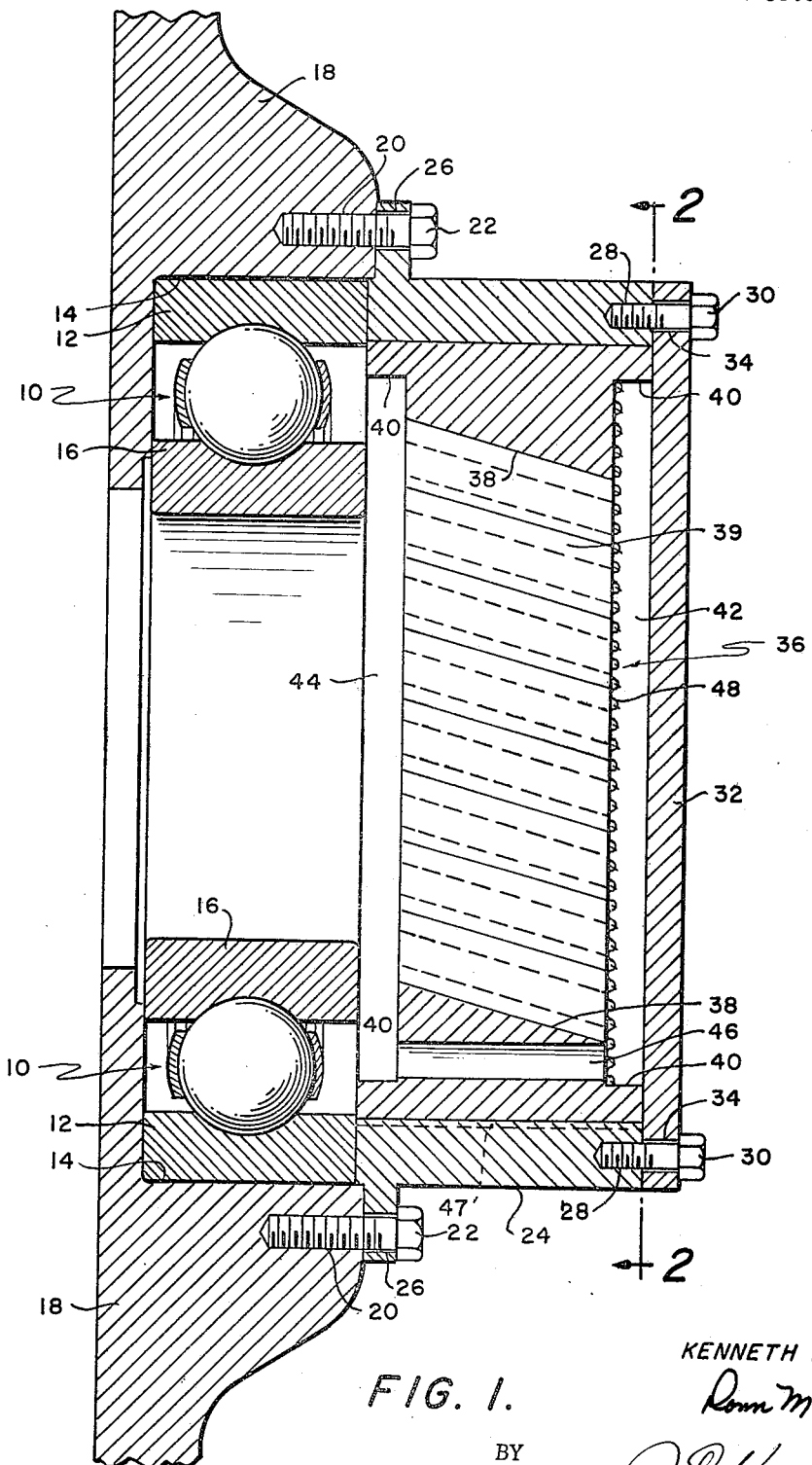
FIG. 1 is a longitudinal cross-sectional view of a bearing in a motor end bell having a lubricating housing attached thereto.
Figure 2:
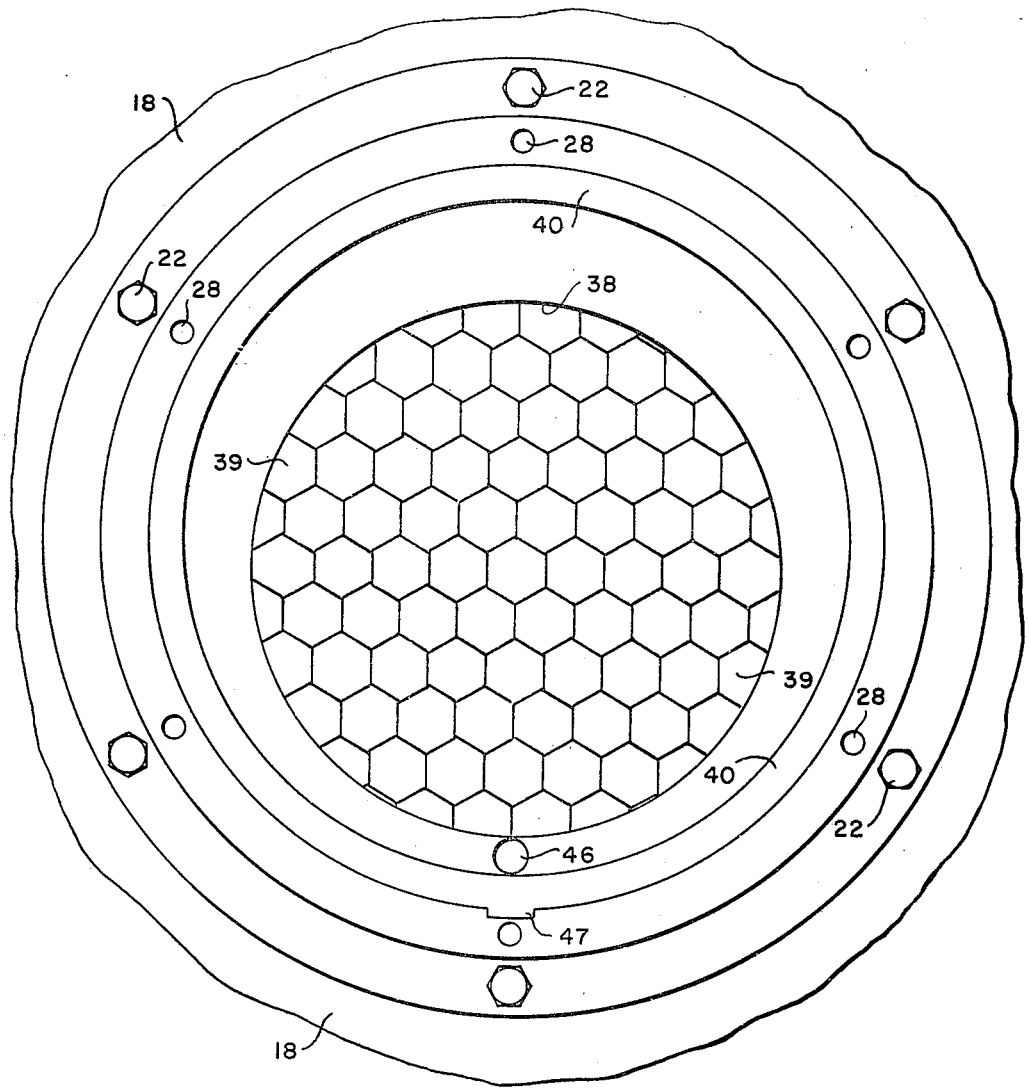
FIG. 2 is a transverse cross-sectional view of the grease reservoir within the lubricating housing.

Referring now to FIGS. 1 and 2, there is shown a bearing 10 having its outer race 12 prefitted into a bearing bore 14 formed in the end bell of a motor, for example. The inner race 16 of bearing 10 is preset to shaft 18 in any conventional manner. About the periphery of the bearing bore 14 is a plurality of holes 20 in a concentric bolt circle on the exterior portion of end bell 18. Holes 20 are tapped to receive conventional screw fasteners 22.

A lubrication housing 24 is attached to the end bell 18 concentric with the bearing bore 14 in a sealing relationship with the bearing bore by the screw fasteners 22. The lubrication housing 24 is characterized by an open cylinder having a transverse extending flange 26 having a plurality of holes 28 in a bolt circle for alignment with holes 20 in the end of bell 18. The other end of the lubrication housing 24 contains tapped holes 28 for receiving screw fasteners 30. This end of the lubrication housing is covered and sealed by a circular plate 32 also containing a plurality of holes 34 in a bolt circle for mating with the tapped holes 28.

Within the lubrication housing 24, there is contained a grease reservoir 36 having an outside diameter approximately equalling the internal diameter of the lubrication housing 24. The grease reservoir 36 may be inserted and removed upon removal of the circular plate 32. In a canted or slanted aperture 38 formed in the grease reservoir 36, is placed a section of honeycomb material 39 which may be made of aluminum or impregnated paper. The voids of the honeycomb are parallel to the canted hole 38 and directed downwardly away from the bearing 10.

Each end of the grease reservoir 36 is counterbored to form a flange 40 about the periphery of the grease reservoir, and therefore when the reservoir is inserted into the lubrication housing 24, void spaces 42 and 44 are formed. A passageway 46 is provided at the bottom for the oil to flow into the bearing. To eliminate the possibility of the grease reservoir 36 rotating within the lubrication housing 24 suitable locking means are provided between the two, such as, for example, a key-keyslot arrangement 47. Screen wire 48 is shown in void space 42 against the honeycomb to retain the grease.

DESCRIPTION OF THE OPERATION

The lubricating housing 24 is first attached in a sealing relationship to the end bell 18 by means of the screw fasteners 22. A grease reservoir 36, packed with grease, is inserted into the housing 24 with the key-keyslot arrangement 47 in alignment. The circular plate 32 is then secured in sealing relationship with the end of the lubrication housing 24 by the use of screw fasteners 30.

Operation of the machine utilizing the bearing and the lubrication system may be then commenced. It is recognized that most ball bearings are supplied containing lubricant so there is no need to wait for lubrication by virtue of oil bled out of the grease contained in the grease reservoir 36. As the bearing temperature rises under normal conditions, heat will be transferred to the grease reservoir causing the grease to bleed its oil which will commence dripping from the remote side of the honeycomb material 39 into the void space 42. This oil will settle and collect at the bottom of the grease reservoir and thence flow through the passageway 46 into the lower portion of the bearing 10 where it will supply oil to the space between the inner and outer races and be distributed throughout the bearing by virtue of the progression of the balls' orbital action about the bearing.

It is recognized that the grease contained in honeycomb material 39 may crust and oxidize and also have wear debris deposited thereon near the void space 44. This is of no consequence as the oil bleed from the grease exudes from the remote side of the honeycomb into the void 42 so that considerable lubricant is available to the bearing without the possibility of oil starvation due to the crust. The oil feed will be self-controlled. In other words, as the bearing temperature rises, indicating a need for lubrication, the grease will bleed significantly more oil which thence is delivered to the bearing, cooling it, and thereby retarding the oil bleed from the grease.

What is claimed is:

1. In an anti-friction bearing assembly having a bearing, lubricating means for supplying a lubricating medium to said bearing, and a housing disposed adjacent said bearing for containing said lubricating means, an improvement in said lubricating means comprising:

a reservoir in said housing for containing a quantity of said lubricating medium;

securing means for securing said reservoir within said housing;

a foraminous material disposed within said reservoir for supporting said quantity of lubricating medium within its voids and wherein, said material includes a side adjacent said bearing and a side remote from said bearing, and said voids are slanted downwardly away from said bearing whereby a portion of said lubricating medium will be released from the voids at the remote side of said material; and a passageway disposed within said reservoir and located below said foraminous material, said passageway including an opening at said remote side and an opening at said adjacent side near said bearing whereby that portion of said lubricating medium released at the remote side of said material is transferred to said bearing.

2. The apparatus of claim 1 wherein the foraminous material is a honeycomb structure.

3. The apparatus of claim 2 wherein the honeycomb material is produced from aluminum.

4. The apparatus of claim 2 wherein the honeycomb material is produced from impregnated paper.

5. The apparatus of claim 1 wherein the foraminous material is a felt material.

6. The device of claim 2 further comprising a screen placed over the remote side of the honeycomb material to prevent slumping of the lubricating medium.

References Cited

UNITED STATES PATENTS 2,919,148  12/1959  Smith _____ 308—187
3,017,230  1/1962  Meermans _____ 308—187

MARTIN P. SCHWADRON, Primary Examiner

F. SUSKO, Assistant Examiner